US 8,126,896 B2

(12) United States Patent
Sako

(10) Patent No.: US 8,126,896 B2
(45) Date of Patent: Feb. 28, 2012

(54) INFORMATION PROCESSING APPARATUS, CONTROL METHOD THEREFOR, AND STORAGE MEDIUM

(75) Inventor: Ritsuto Sako, Kawasaki (JP)

(73) Assignee: Canon Kabushiki Kaisha (JP)

( * ) Notice: Subject to any disclaimer, the term of this patent is extended or adjusted under 35 U.S.C. 154(b) by 262 days.

(21) Appl. No.: 12/263,888

(22) Filed: Nov. 3, 2008

(65) Prior Publication Data

US 2009/0119318 A1 May 7, 2009

(30) Foreign Application Priority Data

Nov. 5, 2007 (JP) ................................. 2007-287419

(51) Int. Cl.
*G06F 17/30* (2006.01)
*G06F 7/00* (2006.01)
(52) U.S. Cl. .......... 707/741; 707/711; 707/769; 707/770
(58) Field of Classification Search ........................ None
See application file for complete search history.

(56) References Cited

U.S. PATENT DOCUMENTS

| 7,346,770 | B2 * | 3/2008 | Swander et al. | 713/153 |
|---|---|---|---|---|
| 7,783,880 | B2 * | 8/2010 | Pinkerton et al. | 713/151 |
| 7,849,495 | B1 * | 12/2010 | Huang et al. | 726/1 |
| 2003/0135616 | A1 * | 7/2003 | Carrico et al. | 709/225 |
| 2004/0143758 | A1 * | 7/2004 | Swander et al. | 713/201 |
| 2004/0215616 | A1 * | 10/2004 | Ogawa et al. | 707/9 |
| 2005/0086511 | A1 * | 4/2005 | Balacheff et al. | 713/200 |
| 2005/0135271 | A1 * | 6/2005 | Inoue et al. | 370/254 |
| 2005/0149732 | A1 * | 7/2005 | Freeman et al. | 713/171 |
| 2007/0011448 | A1 * | 1/2007 | Chhabra et al. | 713/151 |
| 2007/0174479 | A1 * | 7/2007 | Sperry et al. | 709/233 |
| 2010/0077203 | A1 * | 3/2010 | Ogawa et al. | 713/153 |

FOREIGN PATENT DOCUMENTS

| JP | 5-189538 A | 7/1993 |
|---|---|---|
| JP | 2008-129749 A | 6/2008 |

OTHER PUBLICATIONS

Office Action issued in Counterpart Japanese Patent application 2007-287419 dated Dec. 14, 2011.

* cited by examiner

*Primary Examiner* — Greta Robinson
*Assistant Examiner* — James J Wilcox
(74) *Attorney, Agent, or Firm* — Rossi, Kimms & McDowell LLP

(57) ABSTRACT

An information processing apparatus capable of collecting electronic data efficiently and avoiding sharing highly confidential and secure electronic data with an indefinite number of users. The information processing apparatus is connected to an external apparatus through a network. The information processing apparatus receives electronic data from the external apparatus, registers attribute information related to the received electronic data in association with the received electronic data so that the received electronic data can be retrieved by using the attribute information, and controls the registering unit so as to register the attribute information related to the received electronic data when the received electronic data is not confidential data, and so as not to register the attribute information related to the received electronic data when the received electronic data is confidential data.

5 Claims, 8 Drawing Sheets

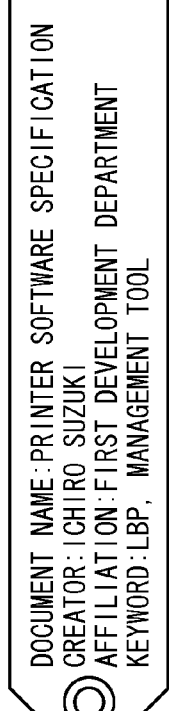
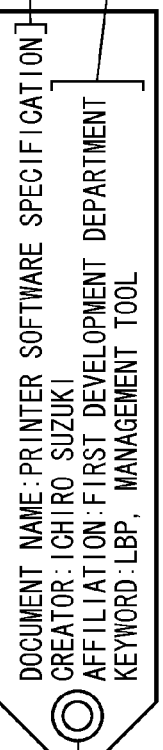
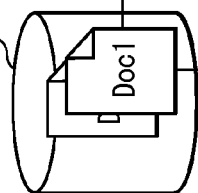
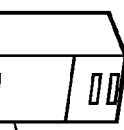

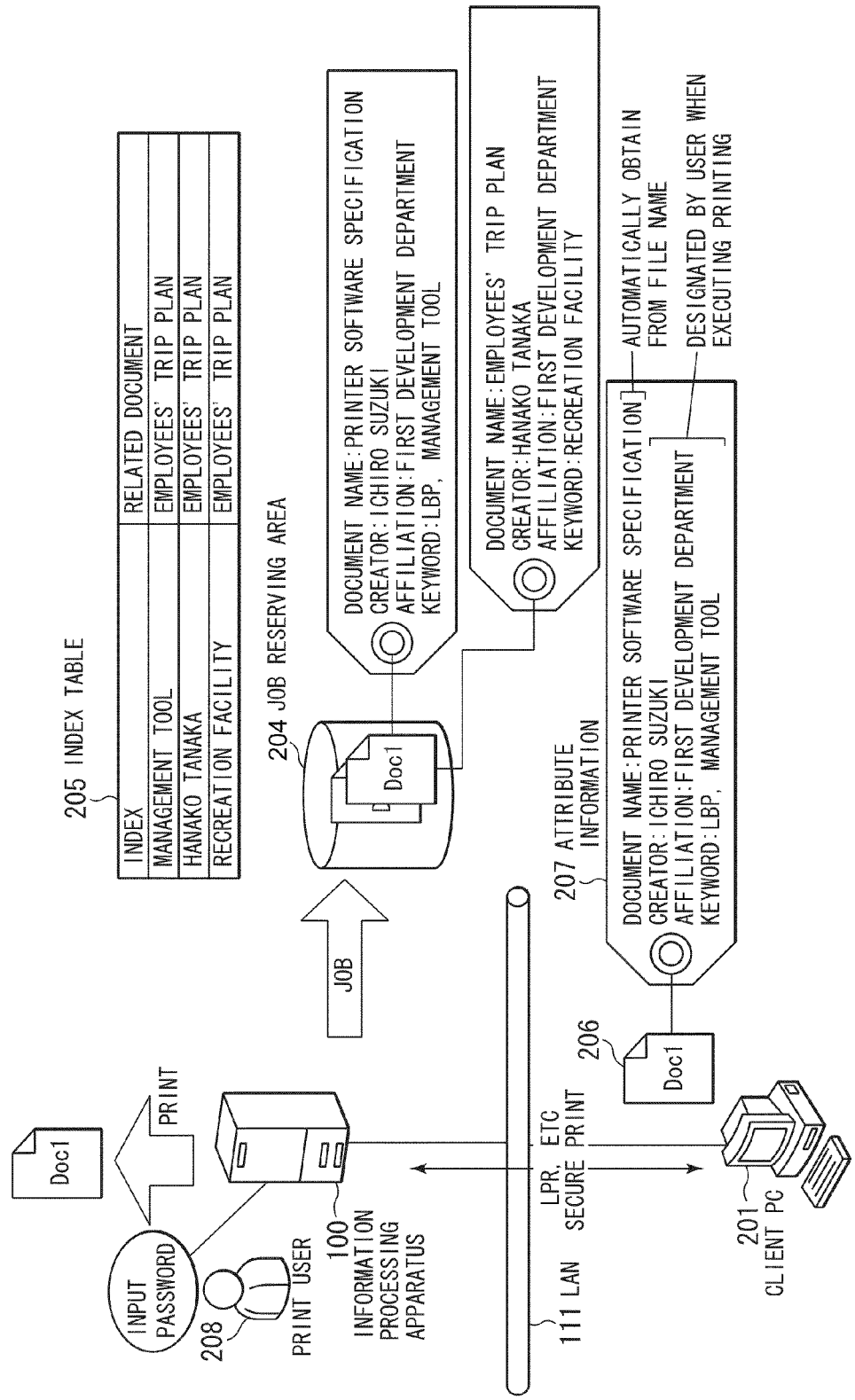

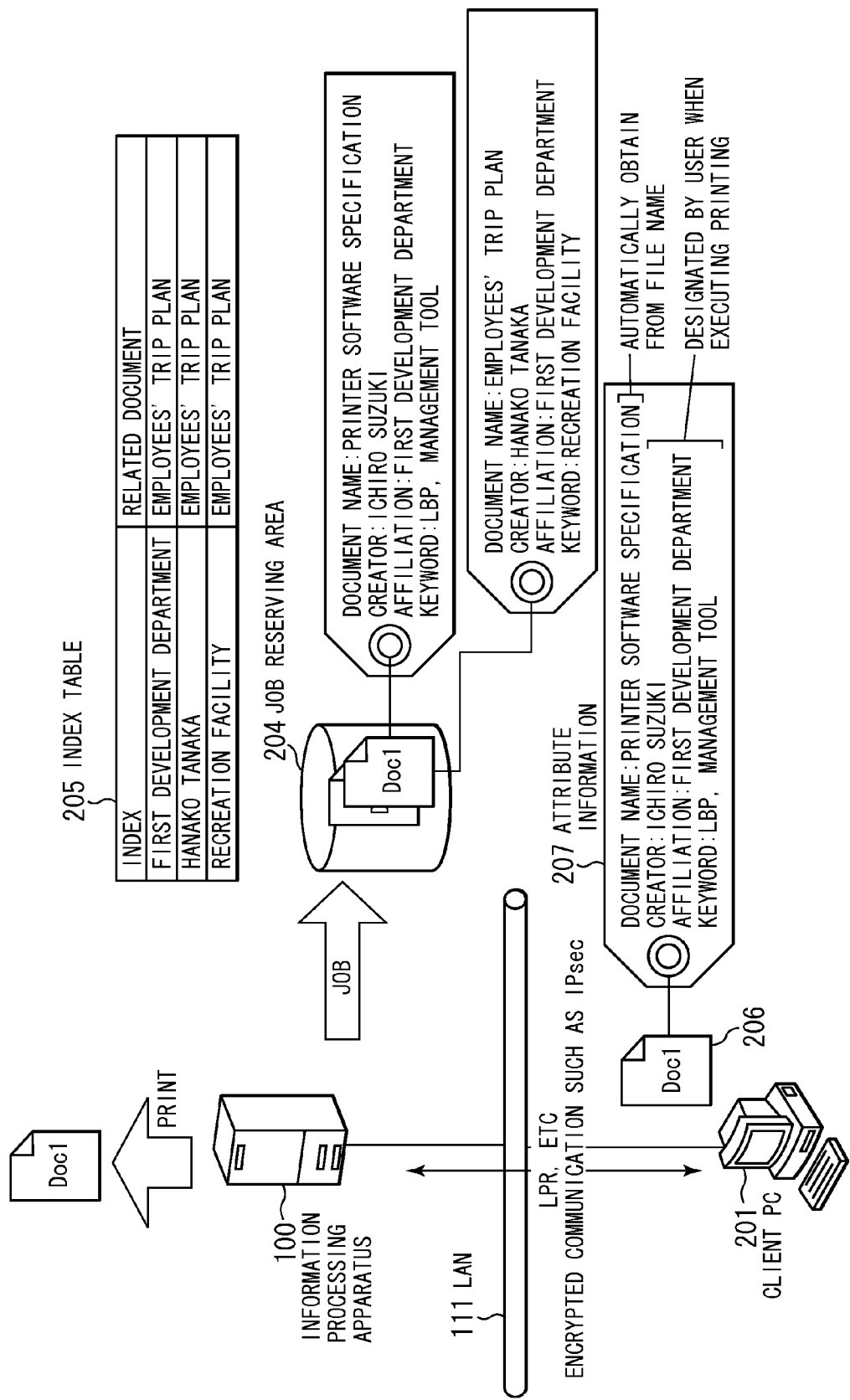

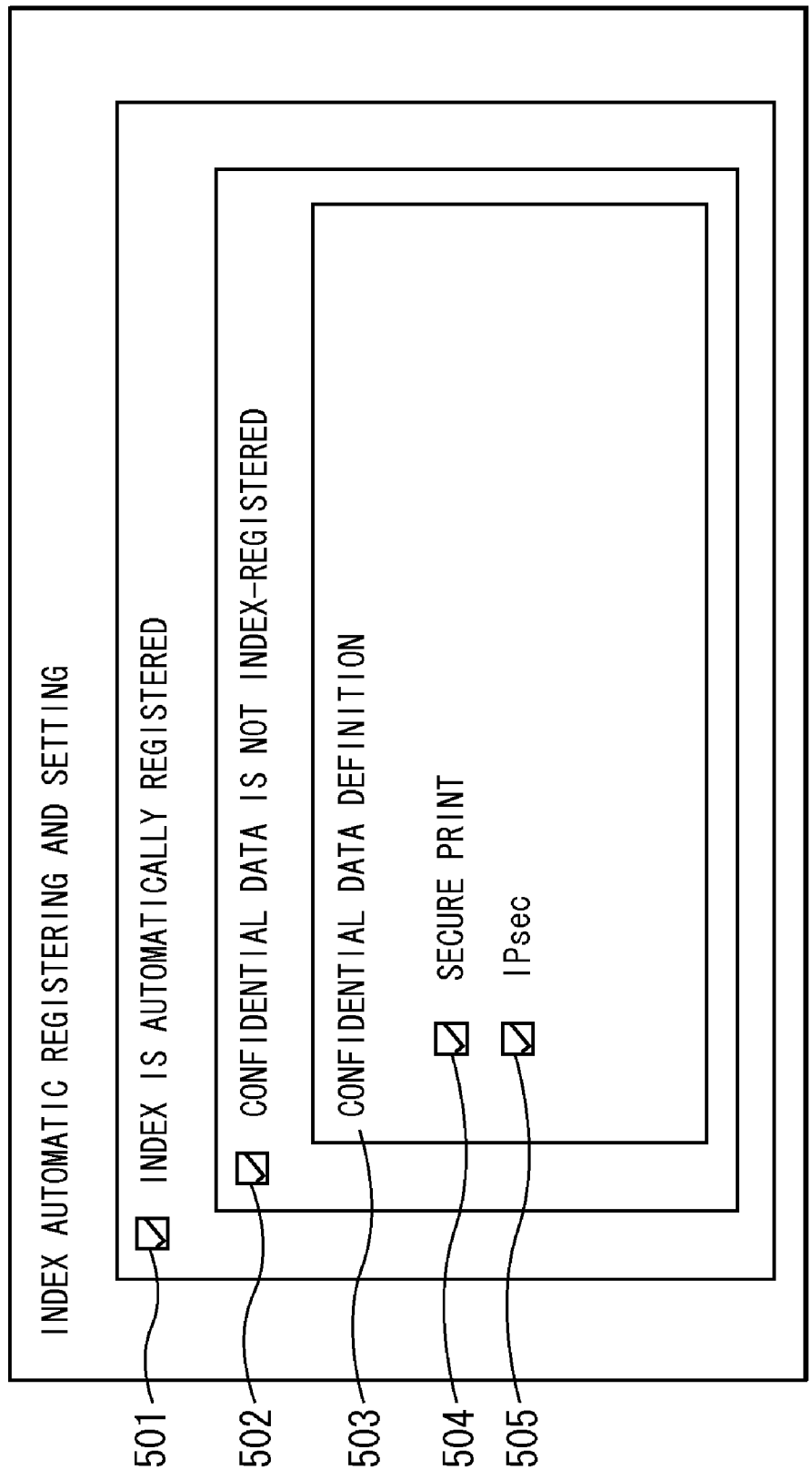

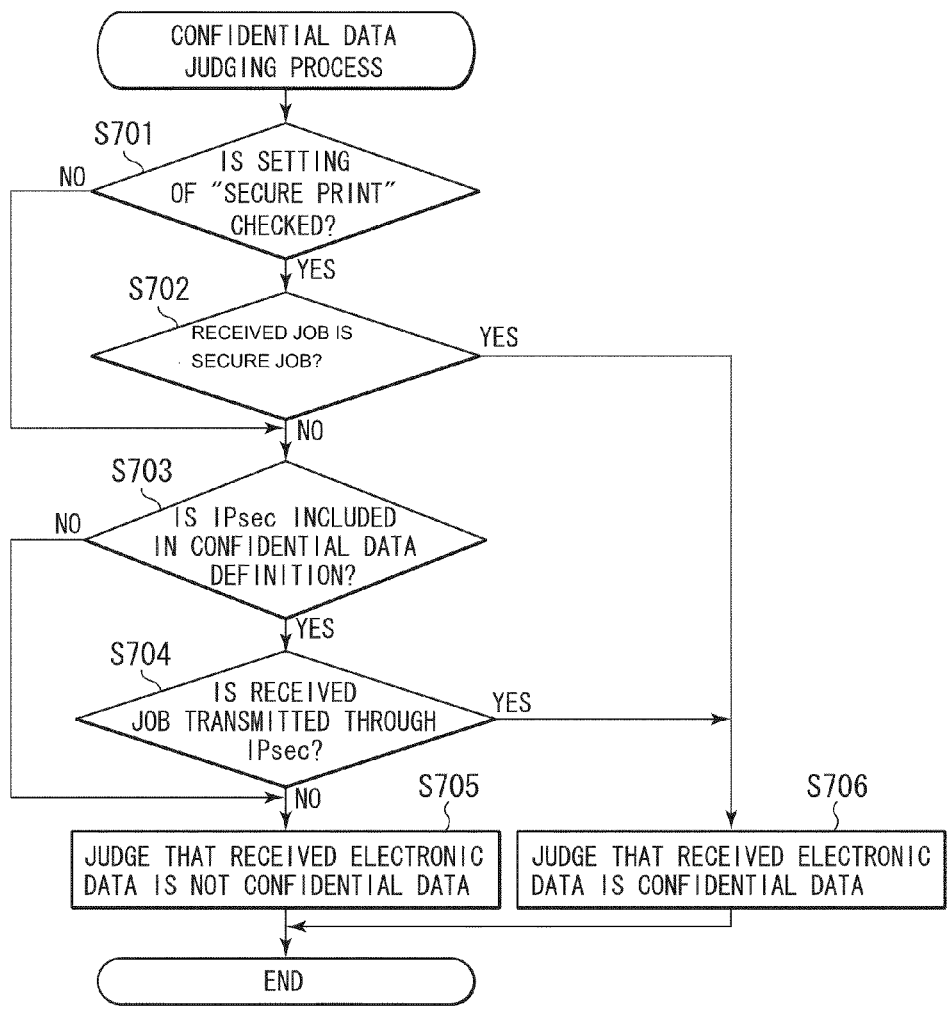

INFORMATION PROCESSING APPARATUS, CONTROL METHOD THEREFOR, AND STORAGE MEDIUM

BACKGROUND OF THE INVENTION

1. Field of the Invention

The present invention relates to an information processing apparatus having a function of sharing electronic data with a plurality of users, as well as a control method therefor and a storage medium.

2. Description of the Related Art

Conventionally, there has been an information processing apparatus for receiving electronic data to be printed from an external apparatus and reserving the received electronic data therein, wherein the electronic data is effectively utilized by a plurality of users referring to and sharing the reserved electronic data.

In such an information processing apparatus, to efficiently collect the electronic data, the electronic data received from the external apparatus is automatically accumulated in the information processing apparatus. To enable a user to easily obtain the desired electronic data, when reserving the electronic data, attribute information related to the electronic data is automatically registered in association with the electronic data in the information processing apparatus. Thereby, the user can retrieve the desired electronic data by using the attribute information as a key.

However, in such an information processing apparatus, since the attribute information related to the received electronic data is automatically registered, it is possible to wrongly share, with an indefinite number of the users, the highly confidential and secure electronic data. Particularly, when it is possible to refer to the reserved electronic data through a network, the above problem becomes more serious. To deal with such a problem, it is considered to input a security protection code when reserving the electronic data; however, work for inputting the security protection code is complicated.

In addition, the information processing apparatus has been proposed, of determining whether or not information such as "duplicate prohibited" and "for internal use only" is included in the electronic data, setting up a flag in a security protection item of a code information part according to a result of this determination, and restricting to retrieve and output the electronic data according to the set up flag (for example, refer to Japanese Laid-Open Patent Publication (Kokai) No. H05-189538).

However, according to the above information processing apparatus, as long as the received electronic data does not include the information such as "duplicate prohibited" and "for internal use only", it is impossible to restrict the electronic data to be accessed, and it is possible to wrongly share highly confidential and secure electronic data with an indefinite number of users.

SUMMARY OF THE INVENTION

Accordingly, the present invention provides an information processing apparatus capable of collecting electronic data efficiently and avoiding sharing highly confidential and secure electronic data with an indefinite number of users, as well as a control method therefor and a storage medium.

In a first aspect of the present invention, there is provided with an information processing apparatus connected to an external apparatus through a network, comprising: a receiving unit adapted to receive electronic data from the external apparatus; a registering unit adapted to register attribute information related to the received electronic data in association with the received electronic data so that the received electronic data can be retrieved by using the attribute information; a judging unit adapted to judge whether or not the received electronic data is confidential data; and a controlling unit adapted to control the registering unit so as to register the attribute information related to the received electronic data when the received electronic data is not confidential data, and so as not to register the attribute information related to the received electronic data when the received electronic data is confidential data.

In a second aspect of the present invention, there is provided with an information processing apparatus connected to an external apparatus through a network, comprising: a receiving unit adapted to receive electronic data from the external apparatus; a reserving unit adapted to reserve the received electronic data; and a judging unit adapted to judge whether or not the received electronic data is confidential data, wherein the reserving unit is adapted to reserve the received electronic data as an object not to be retrieved when the received electronic data is confidential data, and to reserve the received electronic data as an object to be retrieved when the received electronic data is not confidential data.

In a third aspect of the present invention, there is provided with a method of controlling an information processing apparatus connected to an external apparatus through a network, comprising the steps of: receiving electronic data from the external apparatus; registering attribute information related to the received electronic data in relation to the received electronic data so that the received electronic data can be retrieved by using the attribute information; judging whether or not the received electronic data is confidential data; and controlling the registering step so as to register the attribute information related to the received electronic data when the received electronic data is not confidential data, and so as not to register the attribute information related to the received electronic data when the received electronic data is confidential data.

In a fourth aspect of the present invention, there is provided with a method of controlling an information processing apparatus connected to an external apparatus through a network, comprising the step of: receiving electronic data from the external apparatus; reserving the received electronic data; and judging whether or not the received electronic data is confidential data, wherein the reserving step comprises reserving the received electronic data as an object not to be retrieved when the received electronic data is confidential data, and reserving the received electronic data as an object to be retrieved when the received electronic data is not confidential data.

In a fifth aspect of the present invention, there is provided with a storage medium storing a program for causing a computer to execute a method of controlling an information processing apparatus connected to an external apparatus through a network, the method comprising the steps of: receiving electronic data from the external apparatus; registering attribute information related to the received electronic data in relation to the received electronic data so that the received electronic data can be retrieved by using the attribute information; judging whether or not the received electronic data is confidential data; and controlling the registering step so as to register the attribute information related to the received electronic data when the received electronic data is not confidential data, and so as not to register the attribute information related to the received electronic data when the received electronic data is confidential data.

In a sixth aspect of the present invention, there is provided with a storage medium storing a program for causing a computer to execute a method of controlling an information processing apparatus connected to an external apparatus through a network, the method comprising the step of: receiving electronic data from the external apparatus; reserving the received electronic data; and judging whether or not the received electronic data is confidential data, wherein the reserving step comprises reserving the received electronic data as an object not to be retrieved when the received electronic data is confidential data, and reserving the received electronic data as an object to be retrieved when the received electronic data is not confidential data.

According to the present invention, it is possible to collect electronic data efficiently, and avoid wrongly sharing highly confidential and secure electronic data with indefinite number of users.

The above and other objects, features, and advantages of the invention will become more apparent from the following detailed description taken in conjunction with the accompanying drawings.

BRIEF DESCRIPTION OF THE DRAWINGS

FIG. 2 is a view showing a system of a client PC and the information processing apparatus of FIG. 1 connected to each other through a LAN, in which the information processing apparatus of FIG. 1 newly registers attribute information.

FIG. 3 is a view showing the system of the client PC and the information processing apparatus of FIG. 1 is connected to each other through the LAN, in which the information processing apparatus of FIG. 1 executes secure printing.

FIG. 4 is a view showing the system of the client PC and the information processing apparatus of FIG. 1 is connected to each other through the LAN, in which the information processing apparatus of FIG. 1 uses a protocol such as the IPsec, and encrypts a communication path to execute the printing.

FIG. 5 is a view showing an index automatic registering and setting screen in the information processing apparatus of FIG. 1.

FIG. 7 is a flowchart showing the procedure of a confidential data judging process executed in step S603 of FIG. 6.

FIG. 8 is a view showing an example of an index table prepared by the information processing apparatus of FIG. 1.

DETAILED DESCRIPTION OF THE PREFERRED EMBODIMENT

The present invention will now be described in detail with reference to the drawings showing preferred embodiments thereof.

Figure 1:
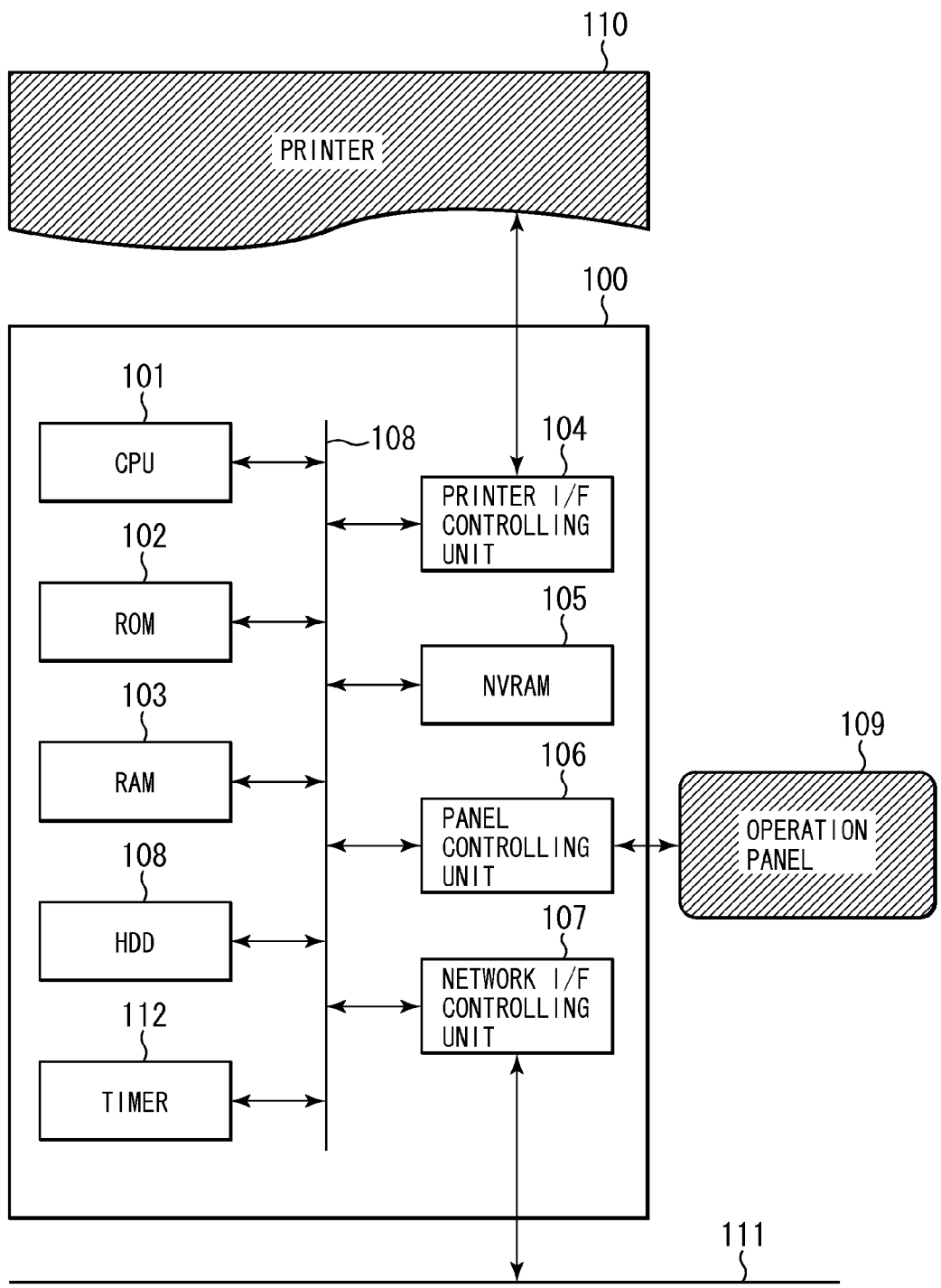
FIG. 1 is a block diagram schematically showing a hardware configuration of an information processing apparatus according to an embodiment of the present invention.

FIG. 1 is a block diagram schematically showing a hardware configuration of an information processing apparatus according to an embodiment of the present invention.

As shown in FIG. 1, an information processing apparatus 100 according to an embodiment of the present invention is provided with a CPU 101, a ROM 102, a RAM 103, an HDD 108, a timer 112, a printer I/F controlling unit 104, an NVRAM 105, a panel controlling unit 106, and a network I/F controlling unit 107.

The CPU 101 executes a software program to control the whole apparatus. The ROM (Read Only Memory) 102 stores a boot program, fixed parameters, and the like of the apparatus. The RAM (Random Access Memory) 103 temporarily stores data when the CPU 101 controls the apparatus.

The HDD (Hard Disk Drive) 108 stores a variety of pieces of data such as print data. The timer 112 manages an elapsed time in a timer process. The printer I/F controlling unit 104 controls a printer 110. The NVRAM 105 is a nonvolatile memory to reserve a variety of setting values for the apparatus.

The panel controlling unit 106 controls an operation panel 109, and displays a variety of pieces of information, and inputs an instruction from a user. The network I/F controlling unit 107 transmits and receives data to and from a LAN (network) 111.

A bus 113 is connected to the CPU 101, the ROM 102, the RAN 103, the HDD 108, the timer 112, the printer I/F controlling unit 104, the NVRAM 105, the panel controlling unit 106, and the network I/F controlling unit 107. A control signal from the CPU 101 and a data signal between each apparatus are transmitted and received through this bus 113.

FIG. 2 is a view showing a system of a client PC and the information processing apparatus of FIG. 1 connected to each other through a LAN, in which the information processing apparatus of FIG. 1 newly registers attribute information.

As shown in FIG. 2, the client PC 201 transmits a print document (Doc1) 206 (electronic data) to the information processing apparatus 100 by using a print protocol such as the LPR. The print document 206 is added with attribute information 207, and this attribute information 207 is also transmitted along with the print document 206 to the information processing apparatus 100.

The attribute information 207 includes information such as a document name, a creator, an affiliation, and a keyword. The document name is automatically obtained from a file name when the user prints from the client PC 201, and the information such as the creator, the affiliation, and the keyword is obtained since the user inputs such information when printing from the client PC 201.

The information processing apparatus 100 obtains the attribute information 207 from the received print document 206, and registers data extracted from the attribute information 207 as index information in an index table 205 (FIG. 8). Moreover, the index table 205 is preliminarily stored in the HDD 108.

In the example of FIG. 2, when indexes of "first development department", "Hanako Tanaka", and "recreation facility", which are included in the attribute information on a document of "employees trip plan", have been already registered, the attribute information on a document of "printer software specification" is newly registered. That is, the indexes of "Ichirou Suzuki", "first development department", "LBP", and "management tool", which are included in the attribute information on the "printer software specification", are registered. Meanwhile, here, since the indexes of "Ichirou Suzuki", "LBP", and "management tool" are newly registered in the index table 205, a new record is generated. On the other hand, since the index of "first development department" has been already registered, the document name, which specifies the print document 206, of "printer software specification" is added to a related document.

The information processing apparatus 100 reserves the received print document 206 as an object to be retrieved in a job reserving area 204, and print-outputs the received print document 206. Moreover, the job reserving area 204 is a storage area provided in the HDD 108.

FIG. 3 is a view showing the system of the client PC 201 and the information processing apparatus 100 of FIG. 1 is connected to each other through the LAN 111, in which the information processing apparatus 100 of FIG. 1 executes secure printing.

The secure printing is a function which is generally used when the confidential document is printed. As simply explained, when printing the secure data from the client PC 201, the user sets a password to the job to transmit a set of the job and the password to the information processing apparatus 100.

When receiving the job to which the password is set, the information processing apparatus 100 does not immediately performing the printing, but reserves the print data. The user, which instructs the printing on the client PC 201, inputs the password from a UI panel of the information processing apparatus 100. Only when the password transmitted from the client PC 201 corresponds to the password inputted from the UI panel, the information processing apparatus 100 executes the job to which the password is set.

In the example of FIG. 3, the client PC 201 transmits the print document 206 by using the print protocol such as the LPR to the information processing apparatus 100. At that time, the client PC 201 transmits the print document 206 by applying a secure printing function.

The information processing apparatus 100 reserves the received print document 206 in the job reserving area 204. A user 208 inputs the password from the operation panel 109 of the information processing apparatus 100. The information processing apparatus 100 determines whether or not the password transmitted from the client PC 201 and the password inputted from the operation panel 109 correspond to each other, and when both passwords correspond to each other, the information processing apparatus 100 prints the received secure print document 206.

In the example of FIG. 3, since a printing job is secure, unlike the example of FIG. 2, the attribute information is not registered to the index table 205. That is, the print document 206 is reserved as an object not to be retrieved in the job reserving area 204. Meanwhile, after the print document 206 is printed, such a print document 206 may be deleted from the job reserving area 204.

FIG. 4 is a view showing the system of the client PC and the information processing apparatus of FIG. 1 is connected to each other through the LAN, in which the information processing apparatus of FIG. 1 uses a protocol such as the IPsec, and encrypts a communication path to execute the printing.

In the example of FIG. 4, the client PC 201 encrypts a communication path by using the print protocol such as the LPR, to which the IPsec is applied, to transmit the print document 206 to the information processing apparatus 100. In the IPsec, data is encrypted and subsequently communicated with a previously designated node (specified by an IP address). Information on the node, to which the IPsec is applied, is reserved in the NVRAM 105 of the information processing apparatus 100.

When the communication connection is established, the information processing apparatus 100 determines, from the IP address of a communication partner, whether or not the communication is the IPsec communication, and when the communication is the IPsec communication, the information processing apparatus 100 reserves the received print document 206 in the job reserving area 204. Next, the information processing apparatus 100 prints the received print document 206. In the example of FIG. 4, unlike the example of FIG. 2, the information processing apparatus 100 does not register the attribute information to the index table 205. That is, the information processing apparatus 100 reserves the print document 206 as a document not to be retrieved in the job reserving area 204. Meanwhile, after the print document 206 is printed, such a print document 206 may be deleted from the job reserving area 204.

FIG. 5 is a view showing an index automatic registering and setting screen in the information processing apparatus 100 of FIG. 1.

In FIG. 5, the information processing apparatus 100 can execute a variety of settings for the index automatic registering through the operation panel 109.

When a setting 501 of "Index is automatically registered" is checked, the information processing apparatus 100 automatically registers the index information on the received electronic data in the index table 205.

When a setting 502 of "Confidential data is not index-registered" is checked, the information processing apparatus 100 registers the index of data other than the confidential data, but does not register the index of the confidential data.

In the present embodiment, in a setting screen 503 of "confidential data definition" displayed on the operation panel 109, it is possible to define the confidential data.

For example, when a setting 504 of "Secure print" is checked, the job printed with the secure printing is designated as the confidential data. When a setting 505 of "IPsec" is checked, the job printed through the IPsec is designated as the confidential data.

Figure 6:
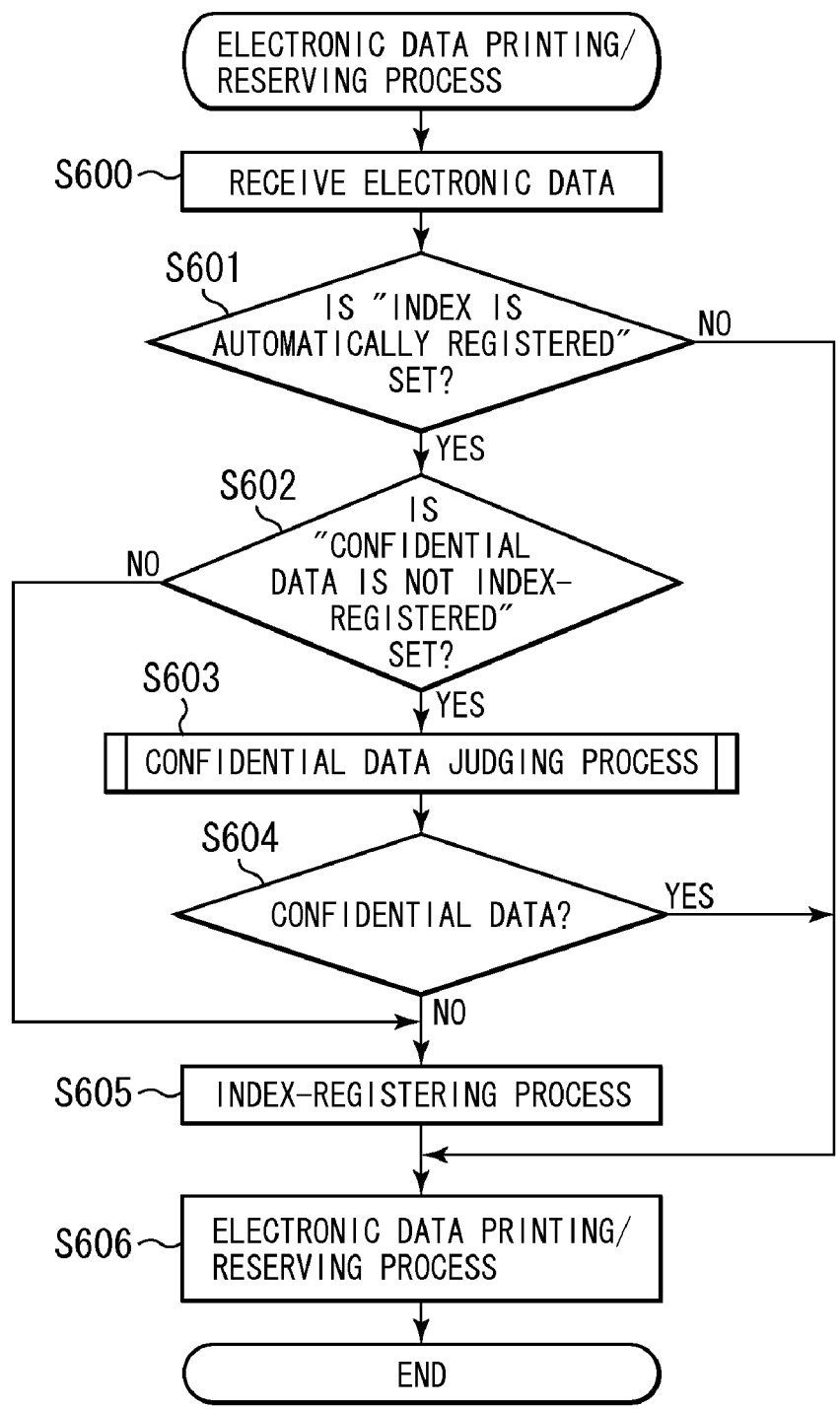
FIG. 6 is a flowchart showing the procedure of an electronic data printing/reserving process executed by the information processing apparatus of FIG. 1.

FIG. 6 is a flowchart showing the procedure of an electronic data printing/reserving process executed by the information processing apparatus 100.

The process of FIG. 6 is executed by the CPU 101 in the information processing apparatus 100, while a control program stored in the ROM 102 or the HDD 108 being loaded to the RAM 103.

First, when the electronic data is received from the client PC 201 (step S600), it is determined whether or not the setting 501 of "Index is automatically registered" of FIG. 5 is checked (step S601).

As a result of the determination of the step S601, when the setting 501 of "Index is automatically registered" of FIG. 5 is not checked, an electronic data printing/reserving process (step S606), followed by terminating the process. On the other hand, as a result of the determination of the step S601, when the setting 501 of "Index is automatically registered" of FIG. 5 is checked, it is determined whether or not the setting 502 of "Confidential data is not index-registered" of FIG. 5 is checked (step S602).

As a result of the determination of the step S602, when the setting 502 of "Confidential data is not index-registered" of FIG. 5 is not checked, the index information is registered to the index table 205 (step S605), and subsequently the electronic data printing/reserving process (step S606), followed by terminating the process. On the other hand, as a result of the determination of the step S602, when the setting 502 of "Confidential data is not index-registered" of FIG. 5 is checked, a confidential data judging process of FIG. 7 hereinafter described is executed (step S603), and it is determined whether or not the electronic data is the confidential data (step S604).

As a result of the determination of the step S604, when the electronic data is not the confidential data, the index information is registered to the index table 205 (step S605), and subsequently the information processing apparatus 100 executes the electronic data printing/reserving process (step S606), followed by terminating the process. On the other hand, as a result of the determination of the step S604, when the electronic data is the confidential data, the index information is not registered to the index table 205 (step S605), but the information processing apparatus 100 executes the electronic data process (print/store) (step S606), followed by terminating the process.

FIG. 7 is a flowchart showing the procedure of a confidential data judging process executed in step S603 of FIG. 6.

The process of FIG. 7 is executed by the CPU 101 in the information processing apparatus 100, while the control program stored in the ROM 102 or the HDD 108 being loaded to the RAM 103.

In FIG. 7, in the setting screen 503 of "confidential data definition" of FIG. 5, first, it is determined whether or not the setting 504 of "Secure print" is checked (step S701).

As a result of the determination of the step S701, when the setting 504 of "Secure print" is not checked, it is determined, in the setting screen 503 of "Confidential data definition" of FIG. 5, whether or not the setting 505 of "IPsec" is checked (step S703).

On the other hand, as a result of the determination of the step S701, when the setting 504 of "Secure print" is checked, it is determined whether or not the received job is the secure job (step S702), and when the received job is the secure job, it is determined that the received electronic data is the confidential data (step S706), followed by terminating the process.

On the other hand, as a result of the determination of the step S702, when the received job is not the secure job, it is determined, in the setting screen 503 of "Confidential data definition" of FIG. 5, whether or not the setting 505 of "IPsec" is checked (step S703).

As a result of the determination of the step S703, when the setting 505 of "IPsec" is not checked, it is judged that the received electronic data is not the confidential data (step S705), followed by terminating the process. On the other hand, as a result of the determination of the step S703, when the setting 505 of "IPsec" is checked, it is determined whether or not the received job is transmitted through the IPsec (step S704).

As a result of the determination of the step S704, when the received job is transmitted through the IPsec, it is judged that the received electronic data is the confidential data (step S706), followed by terminating the process. On the other hand, when the received job is not transmitted through the IPsec, it is determined that the received electronic data is not the confidential data (step S705), followed by terminating the process.

FIG. 8 is a view showing an example of the index table 205 prepared by the information processing apparatus 100 of FIG. 1.

As shown in FIG. 8, in the index table 205, the attribute information on the received electronic data is registered as an index key in an index column 801, and the electronic data whose attribute corresponds to such an index is registered in a related document column 802. For example, for the index "Ichiro Suzuki", the related documents such as "Patent proposal" and "Printer software specification" are registered as the document related to such an index.

Figure 9:
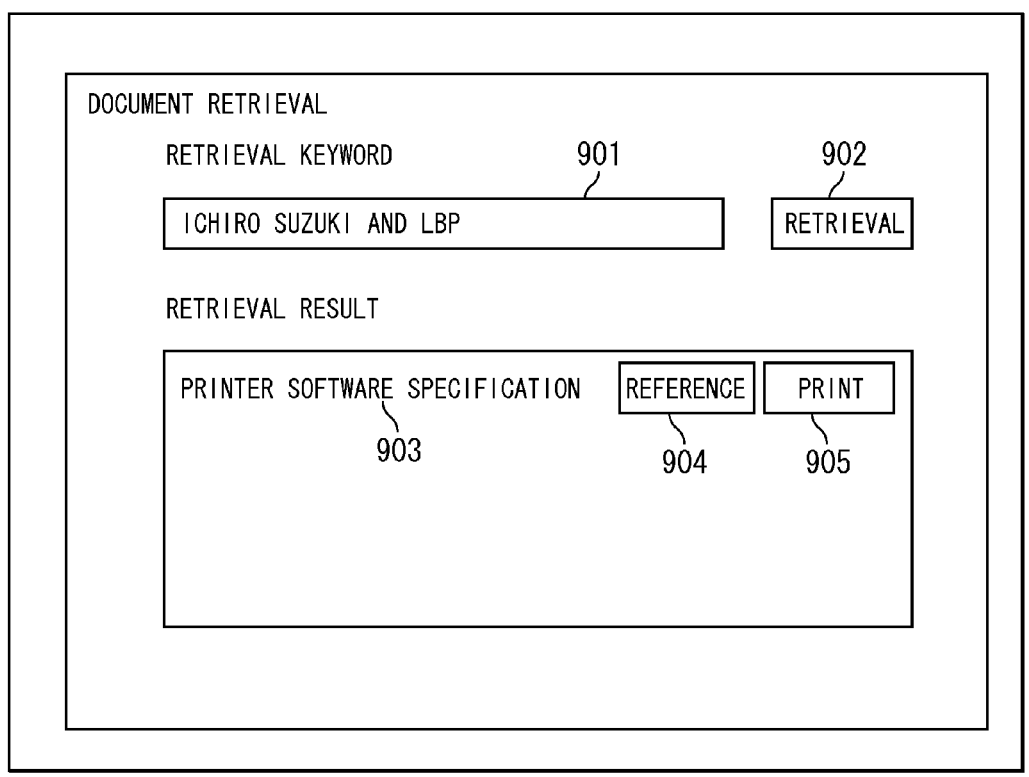
FIG. 9 is a view which is useful in explaining a UT screen for retrieving a print document reserved in the information processing apparatus of FIG. 1.

FIG. 9 is a view which is useful in explaining an example of a UI screen for retrieving the print document reserved in the information processing apparatus 100 of FIG. 1.

As shown in FIG. 9, in this UI screen, a retrieval keyword is inputted to a retrieval keyword input field 901. For designating the retrieval keyword in the retrieval keyword input field 901, a logical OR and a logical AND can be used by using "and" and "or".

When a retrieval button 902 is pushed down after the retrieval keyword is inputted in the retrieval keyword input field 901, the print document is retrieved by referring to the index table 205 of FIG. 8, and the retrieved print document is displayed in a retrieval result display field 903. A preview of the document displayed in the retrieval result display field 903 can be displayed by pushing down a reference button 904. Pushing down a Print button 905 enables the print document displayed in the retrieval result display field 903 to be printed.

As described above, the present embodiment has a function of automatically accumulating the index information on the transmitted electronic data, it is possible to efficiently collect the electronic data.

The present invention has a function of automatically judging the secure electronic data of high confidentiality based on the kind of the transmitting method, it is possible to avoid, without the explicit designation by the user, wrongly sharing the secure electronic data with the indefinite number of the users.

Meanwhile, the present invention is not limited to the above exemplified embodiment, and can be arbitrarily changed without departing from the concept of the present invention.

It is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of any of the embodiments described above, and hence the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of the above described embodiment may be accomplished not only by executing a program cord read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2007-287419 filed Nov. 5, 2007, which is hereby incorporated by reference herein in its entirety.

What is claimed is:

1. An information processing apparatus that communicates with an external apparatus through a network, comprising:

a receiving unit adapted to receive electronic data from the external apparatus;

a registering unit adapted to perform a registration of attribute information related to the received electronic data, the registration causing the attribute information to be registered as index information in association with the received electronic data in a storage device in the information processing apparatus so that the received electronic data can be retrieved by using the attribute information;

a judging unit adapted to judge whether or not the received electronic data is confidential data; and a controlling unit adapted to control said registering unit to perform the registration of the attribute information when the received electronic data is judged by the judging unit not to be confidential data, and not to perform the registration of the attribute information when the received electronic data is judged by the judging unit to be confidential data, wherein said judging unit is adapted to judge that the received electronic data is confidential data when the receiving unit receives the electronic data through IPsec communication, and to judge that the received electronic data is not confidential data when the receiving unit receives the electronic data not through the IPsec communication.

2. An information processing apparatus as claimed in claim 1, wherein the attribute information includes information related to a keyword used when retrieving the electronic data.

3. An information processing apparatus as claimed in claim 1, wherein said judging unit is adapted to judge that the received electronic data is confidential data when the received electronic data includes a password, and to judge that the received electronic data is not confidential data when the received electronic data does not include a password.

4. A method of controlling an information processing apparatus that communicates with an external apparatus through a network, comprising the steps of:

receiving electronic data from the external apparatus;

performing a registration of attribute information related to the received electronic data, the registration causing the attribute information to be registered as index information in association with the received electronic data in a storage device in the information processing apparatus so that the received electronic data can be retrieved by using the attribute information;

judging whether or not the received electronic data is confidential data; and controlling said performing step to perform the registration of the attribute information when the received electronic data is judged in the judging step not to be confidential data, and not to perform the registration of the attribute information when the received electronic data is judged in the judging step to be confidential data, wherein said judging step includes judging that the received electronic data is confidential data when the electronic data is received in the receiving step through IPsec communication, and judging that the received electronic data is not confidential data when the electronic data is not received in the receiving step through the IPsec communication.

5. A non-transitory storage medium storing a program for causing a computer to execute a method of controlling an information processing apparatus that communicates with an external apparatus through a network, said method comprising the steps of:

receiving electronic data from the external apparatus;

performing a registration of attribute information related to the received electronic data, the registration causing the attribute information to be registered as index information in association with the received electronic data in a storage device in the information processing apparatus so that the received electronic data can be retrieved by using the attribute information;

judging whether or not the received electronic data is confidential data; and controlling the performing step to perform the registration of the attribute information when the received electronic data is judged in the judging step not to be confidential data, and not to perform the registration of the attribute information when the received electronic data is judged in the judging step to be confidential data, wherein said judging step includes judging that the received electronic data is confidential data when the electronic data is received in the receiving step through IPsec communication, and judging that the received electronic data is not confidential data when the electronic data is not received in the receiving step through the IPsec communication.

* * * * *